(12) United States Patent
Stoettinger et al.

(10) Patent No.: US 11,663,635 B2
(45) Date of Patent: May 30, 2023

(54) CLASSIFICATION OF DANGEROUS GOODS VIA MACHINE LEARNING

(71) Applicant: SAP SE, Walldorf (DE)

(72) Inventors: Julian Stoettinger, Walldorf (DE); Volker Loch, Walldorf (DE); Rolf Mahr, Walldorf (DE); Rohit Kumar Gupta, Heidelberg (DE); Johannes Hoehne, Berlin (DE)

(73) Assignee: SAP SE, Walldorf (DE)

( * ) Notice: Subject to any disclaimer, the term of this patent is extended or adjusted under 35 U.S.C. 154(b) by 1050 days.

(21) Appl. No.: 16/413,058

(22) Filed: May 15, 2019

(65) Prior Publication Data

US 2020/0364495 A1 Nov. 19, 2020

(51) Int. Cl.
*G06N 5/046* (2023.01)
*G06N 20/00* (2019.01)
*G06F 18/2431* (2023.01)
*G06Q 30/0282* (2023.01)
*G06F 16/28* (2019.01)

(52) U.S. Cl.
CPC ....... *G06Q 30/0282* (2013.01); *G06F 16/285* (2019.01); *G06F 18/2431* (2023.01); *G06N 5/046* (2013.01); *G06N 20/00* (2019.01)

(58) Field of Classification Search
None
See application file for complete search history.

(56) References Cited

U.S. PATENT DOCUMENTS

| 10,872,236 | B1 * | 12/2020 | Elor | G06V 30/1452 |
| 2012/0278250 | A1 * | 11/2012 | Miller | G06Q 30/0607 |
| | | | | 705/331 |
| 2019/0244170 | A1 * | 8/2019 | Brownell | G06Q 10/0832 |
| 2020/0057987 | A1 * | 2/2020 | Schrade | G06Q 10/0831 |

OTHER PUBLICATIONS

Cichosz, Pawel. "A case study in text mining of discussion forum posts: classification with bag of words and global vectors." International Journal of Applied Mathematics and Computer Science 28.4 (2018). (Year: 2018).*

Kibria, Sakib B., and Mohammad S. Hasan. "An analysis of feature extraction and classification algorithms for dangerous object detection." 2017 2nd International Conference on Electrical & Electronic Engineering (ICEEE). IEEE, 2017. (Year: 2017).*

Torres, Pedro. "Text recognition for objects identification in the industry." International Conference of Mechatronics and Cyber-Mixmechatronics. Springer, Cham, 2017. (Year: 2017).*

* cited by examiner

*Primary Examiner* — Daniel T Pellett
(74) *Attorney, Agent, or Firm* — Buckley, Maschoff & Talwalkar LLC

(57) ABSTRACT

Provided is a system and method that can identify whether an item is a dangerous good. The system can determine whether a product belongs in any of a number of different classes of dangerous goods from among a plurality of different regulations based on a machine learning algorithm which performs a text-based classification. In one example, the method may include receiving an identification of an object, retrieving a plurality of descriptive attributes of the object from a data store and converting the plurality of descriptive attributes into an input string, predicting whether the object is a dangerous object via execution of a text-based machine learning algorithm that receives the input string as an input, and outputting information about the prediction of the object for display via a user interface.

20 Claims, 8 Drawing Sheets

DB Attributes 230

| | |
|---|---|
| Attribute 1 | Benzenesulfonic acid, 4-C10-13-sec-alkyl derivatives |
| Attribute 2 | Liquid |
| Attribute 3 | soluble pH Value 12 - 13 |
| Attribute 4 | boiling range Value > 100 °C |
| Attribute 5 | Not Oxidizing |
| Attribute 6 | N/A |
| Attribute 7 | Ignitable |
| Attribute 8 | Ignitable (see flash point) Value 100 - < 200 °C |
| ... | ... |
| Attribute N | GHS |

232

⇒

Input String 240

200B

... IDENT 8536-14-7 IDTYPE NAM IDCAT HIS IDENT Benzenesulfonic acid, 4-C10-13-sec-alkyl derivatives State of Matter liquid Remarks Form liquid Remarks soluble pH Value 12 - 13 Type Initial boiling point and boiling range Value > 100 °C Oxidizing Type The substance or mixture is not classified as oxidizing. Result Gases/Solids Not applicable Result Liquids Ignitable (see flash point) Value 100 - < 200 °C Value > 100 °C Regulatory Basis Globally Harmonized System of Classification and Labelling of Chemicals (GHS) Regulatory List GHS Hazard Class Skin corrosion/irritation Hazard Category 1 H314 Causes severe skin burns and eye damage...

Output String 410

... EPA CERCLA Hazardous Substances (40 CFR 302) Regulatory List ZUS_CERCLA Value Type RQ Reportable quantity Value in Non-Standard Unit 48 Non-Standard Unit LBS lbs COMPAVG 0 PROCESSED_SUBIDREF INSERTED_COMP_6 SUBCATREF PURE_SUB COMPCAT ACT_AGENT IDTYPE NUM IDCAT UN IDENT 3107 IDTYPE NUM IDCAT UN IDENT 3109 IDTYPE NUM IDCAT CAS IDENT 80-15-9 IDTYPE NAM IDCAT HIS IDENT CUMYL HYDROPEROXIDE IDTYPE NAM IDCAT HIS IDENT Cumyl hydroperoxide Specific Use(s) End Products No data available Regulatory Basis Globally Harmonized System of Classification and Labelling of Chemicals (GHS) Regulatory List GHS Hazard Class Flam. Liq. Flammable liquids Hazard Category 4 Hazard Statements H227 Combustible liquid. Regulatory List GHS Hazard Class Org. Perox. Organic peroxides Hazard Category D Type D Hazard Statements H242 Heating may cause a fire. Classification Procedure On basis of test data. Regulatory List GHS Hazard Class Acute Tox. Acute toxicity Hazard Category 4 Category 4 Route of Exposure Oral Hazard Statements H302 Harmful if swallowed. Classification Procedure Calculation method Regulatory List GHS Hazard Class Serious eye damage/eye irritation Hazard Category 1 Category 1 Hazard Statements H318 Causes serious eye damage. Regulatory List GHS Hazard Class Skin corrosion/irritation Hazard Category 1 Category 1 Hazard Statements H314 Causes severe skin burns and eye damage. Regulatory List GHS Hazard Class Aquatic Acute Acute aquatic toxicity Hazard Category 2 Category 2 Hazard Statements H401 Toxic to aquatic life. Regulatory List GHS Hazard Class Acute Tox. Acute toxicity Hazard Category 4 Category 4 Route of Exposure Inhalation Hazard Statements H332 Harmful if inhaled. Regulatory List GHS Hazard Class Acute Tox. Acute toxicity Hazard Category 5 Category 5 Route of Exposure Dermal Hazard Statements H313 May be harmful in contact with skin. Regulatory List GHS Hazard Class STOT RE Specific target organ toxicity - repeated exposure Hazard Category 2 Category 2 Route of Exposure Inhalation Target Organ(s) Lungs Hazard Statements H373 May cause damage to organs through prolonged or repeated exposure if inhaled. Regulatory List GHS Hazard Class Aquatic Chronic Chronic aquatic toxicity Hazard Category 3 Category 3 Hazard Statements H412 Harmful to aquatic life with long lasting effects. . .

CLASSIFICATION OF DANGEROUS GOODS VIA MACHINE LEARNING

BACKGROUND

Dangerous goods are items or substances that when transported are a risk to health, safety, property and/or the environment. Dangerous goods include those that are corrosive, flammable, combustible, explosive, oxidizing, water-reactive, and the like, or have other dangerous properties. Improper handling of these goods can cause explosions or fires, serious injury, death and large-scale damage. In the United States, the transportation of dangerous goods is controlled by legislation included in the US Department of Transportation (DOT) Code of Federal Regulations, Title 49 ("49 CFR"). Meanwhile, in Europe the transportation of dangerous goods by road is regulated by the International Carriage of Dangerous Goods by Road (ADR). Similar regulations exists in other jurisdictions, however, there can be subtle (but important) differences that must be followed and accounted for among the different jurisdictions.

Failure to properly classify a good as dangerous (or classify it within its appropriate class of dangerous goods) can cause serious consequences that can range from financial penalties to loss of property or even human life. Therefore, classification of dangerous goods is typically a manual process performed by a human expert who has years of training and expertise. For large organizations, goods are often transported all over the world. In these situations, the expert must be familiar with the rules and regulations of all jurisdictions. In order to classify the goods, the expert must review the properties and characteristics of the end-product and their components. These classifications are then the basis for many subsequent industrial processes in logistics, warehouse management, occupational safety, transport, and others. However, human experts are limited in number and require significant training. Furthermore, the number of regulations is often increasing requiring experts to continually learn and adjust to new rules. Furthermore, humans can make mistakes. Accordingly, what is needed is a mechanism that can improve the classification of dangerous goods.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 4 is a diagram illustrating a user interface provide a visual indicator of proof of a dangerous goods prediction in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

The classification of dangerous goods (DG) is a crucial expert-driven process step throughout the entire process industry. All goods must be classified based on properties and characteristics of the end-product and their components (e.g., ingredients). Typically, this is a manual task done by highly skilled experts. These classifications are then basis for many subsequent industrial processes in logistics, warehouse management, occupational safety and others. Organizations that provide for transport of goods may have hundreds or even thousands of daily transports through different means (train, flight, sea, etc.). Furthermore, each shipment may include different products which are often newly defined. The products may be a mixture of multiple ingredients that can number in the tens or even hundreds. Properties of these different materials may interact with one another in a way that can be considered dangerous. Therefore, a determination must be made as to whether the product is safe and if not, how it should be transported.

As a result, experts doing these evaluations are very busy and are limited in number. Furthermore, these experts can be expensive resulting in a greater cost of the transport that is ultimately passed down to the consumer. Experts must also have a very detailed knowledge of the rules and regulations of different national/international standards. This can require significant expertise. Furthermore, expert decisions have little room for error because mistakes can create danger to human life and/or loss of transport, product, and other freight.

To assist the process of classifying products into one or more classes of dangerous goods, the example embodiments provide a fully automated system that predictions if a product is a dangerous good or not and estimates its risks. For example, the prediction may be performed using an algorithm which considers whether a product should be classified within any class of dangerous good from among all classes (e.g., explosive, gases, flammable, reactive, toxic, oxidizing, infective, radioactive, corrosive, etc.) set forth by a regulation. In addition, the algorithm can also consider multiple regulations at the same time. The system can not only assist experts in the classification process perform a double-check of already classified products to increase accuracy and perform plausibility checks in related industrial processes.

The system may store product attributes (chemical composition, characteristics, descriptions, etc.) of each product that is to be classified. The system can receive an identification of a product and perform the classification by retrieving the product attributes and converting them into a single string value (e.g., one long string value). Here, the system may retrieve the alphanumeric descriptions/values of the individual attributes and concatenate the descriptions into one long sequence which can be input into a text-based classification algorithm (e.g., machine learning algorithm, etc.) In some embodiments, the machine learning algorithm is a deep learning neural network, but embodiments are not limited thereto. The machine learning algorithm can perform a classification of the product based on the text included in the single string value. Here, the machine learning algorithm can provide a probability, a yes/no answer, etc., of whether the product should be classified within each of a plurality of different classes of dangerous goods, for a plurality of different regulations. Furthermore, the system may output the predictions via a user interface which can be viewed by a user (e.g., a human expert, etc.)

The automated classification of dangerous goods can improve the accuracy of the decision by the subject matter expert and in an almost instantaneous fashion. Furthermore, many products (e.g., 75%, etc.) are not dangerous. However, all products must be analyzed by law. The system can quickly label these products as non-dangerous enabling the expert to spend less time reviewing non-dangerous products, and more time on dangerous products.

At the end of the description herein is provided an Appendix which includes a listing of the product attributes (properties) which can be retrieved and added to the single string value. In some cases, a product may not have all of the property values and therefore may have a reading of non-applicable. Also provided in the Appendix is an example of some of the regulations and the danger classes that are associated with each regulation. The predictive algorithm of the example embodiments may provide a classification of a product for each class of each regulation that is desired. For example, a regulation may have 9 classes of dangerous goods. In this example, the algorithm can provide 10 predictions including one for each of the 9 types of classes and one for non-dangerous classification. Furthermore, the algorithm can perform the same prediction across multiple regulations at the same time. Each class has different requirements to meet in order to be considered in that danger class (legal reasons). There are slight differences from regulation to regulation. But if something is flammable in the United States, it is likely flammable in Europe, but maybe slight differences in what is flammable.

Figure 1:
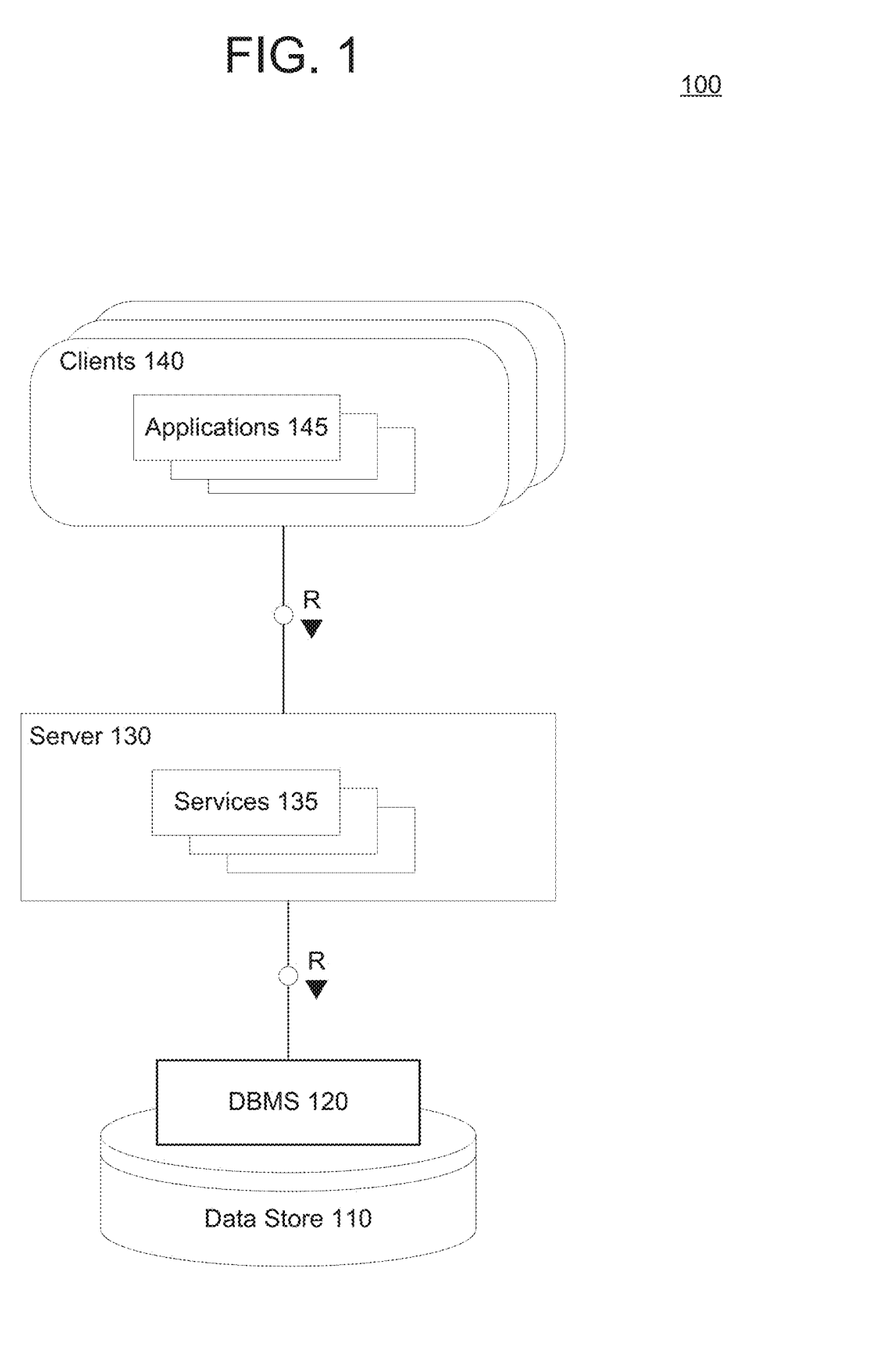
FIG. 1 is a diagram illustrating a database system architecture in accordance with an example embodiment.

FIG. 1 illustrates a system architecture of a database 100 in accordance with an example embodiment. It should be appreciated that the embodiments are not limited to architecture 100 or to a database architecture, however, FIG. 1 is shown for purposes of example. Referring to FIG. 1, the architecture 100 includes a data store 110, a database management system (DBMS) 120, a server 130, services 135, clients 140, and applications 145. Generally, services 135 executing within server 130 receive requests from applications 145 executing on clients 140 and provides results to the applications 145 based on data stored within data store 110. For example, server 130 may execute and provide services 135 to applications 145. Services 135 may comprise server-side executable program code (e.g., compiled code, scripts, etc.) which provide functionality to applications 145 by providing user interfaces to clients 140, receiving requests from applications 145 (e.g., drag-and-drop operations), retrieving data from data store 110 based on the requests, processing the data received from data store 110, and providing the processed data to applications 145.

In one non-limiting example, a client 140 may execute an application 145 to perform dangerous goods classification of a product via a user interface. In this example, the user interface may display, to the client 140, predicted classifications of the product with respect to a plurality of classifications of different types of dangerous goods in each of a plurality of jurisdictions. For example, the application 145 may provide a yes/no, a probability, an indicator, etc. which provides information about whether or not the product is within a respective class of dangerous good. The application 145 may pass requests to one of services 135 based on input received via the client 140. A structured query language (SQL) query may be generated based on the request and forwarded to DBMS 120. DBMS 120 may execute the SQL query to return a result set based on data of data store 110, and the application 145 creates a report/visualization based on the result set.

The services 135 executing on server 130 may communicate with DBMS 120 using database management interfaces such as, but not limited to, Open Database Connectivity (ODBC) and Java Database Connectivity (JDBC) interfaces. These types of services 135 may use SQL and SQL script to manage and query data stored in data store 110. The DBMS 120 serves requests to query, retrieve, create, modify (update), and/or delete data from database files stored in data store 110, and also performs administrative and management functions. Such functions may include snapshot and backup management, indexing, optimization, garbage collection, and/or any other database functions that are or become known.

Server 130 may be separated from or closely integrated with DBMS 120. A closely-integrated server 130 may enable execution of services 135 completely on the database platform, without the need for an additional server. For example, server 130 may provide a comprehensive set of embedded services which provide end-to-end support for Web-based applications. The services 135 may include a lightweight web server, configurable support for Open Data Protocol, server-side JavaScript execution and access to SQL and SQLScript. Server 130 may provide application services (e.g., via functional libraries) using services 135 that manage and query the database files stored in the data store 110. The application services can be used to expose the database data model, with its tables, views and database procedures, to clients 140. In addition to exposing the data model, server 130 may host system services such as a search service, and the like.

Data store 110 may be any query-responsive data source or sources that are or become known, including but not limited to a SQL relational database management system. Data store 110 may include or otherwise be associated with a relational database, a multi-dimensional database, an Extensible Markup Language (XML) document, or any other data storage system that stores structured and/or unstructured data. The data of data store 110 may be distributed among several relational databases, dimensional databases, and/or other data sources. Embodiments are not limited to any number or types of data sources.

In some embodiments, the data of data store 110 may include files having one or more of conventional tabular data, row-based data, column-based data, object-based data, and the like. According to various aspects, the files may be database tables storing data sets. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another. Furthermore, data store 110 may support multiple users that are associated with the same client and that share access to common database files stored in the data store 110.

According to various embodiments, data items (e.g., data records, data entries, etc.) may be stored, modified, deleted, and the like, within the data store 110. As an example, data items may be created, written, modified, or deleted based on instructions from any of the applications 145, the services 135, and the like. Each data item may be assigned a globally unique identifier (GUID) by an operating system, or other program of the database 100. The GUID is used to uniquely identify that data item from among all other data items stored within the database 100. GUIDs may be created in multiple ways including, but not limited to, random, time-based, hardware-based, content-based, a combination thereof, and the like.

The architecture 100 may include metadata defining objects which are mapped to logical entities of data store 110. The metadata may be stored in data store 110 and/or a separate repository (not shown). The metadata may include information regarding dimension names (e.g., country, year, product, etc.), dimension hierarchies (e.g., country, state, city, etc.), measure names (e.g., profit, units, sales, etc.) and any other suitable metadata. According to some embodiments, the metadata includes information associating users, queries, query patterns and visualizations. The information may be collected during operation of system and may be used to determine a visualization to present in response to a received query, and based on the query and the user from whom the query was received.

Each of clients 140 may include one or more devices executing program code of an application 145 for presenting user interfaces to allow interaction with application server 130. The user interfaces of applications 145 may comprise user interfaces suited for reporting, data analysis, and/or any other functions based on the data of data store 110. Presentation of a user interface may include any degree or type of rendering, depending on the type of user interface code generated by server 130. For example, a client 140 may execute a Web Browser to request and receive a Web page (e.g., in HTML format) from application server 130 via HTTP, HTTPS, and/or WebSocket, and may render and present the Web page according to known protocols.

One or more of clients 140 may also or alternatively present user interfaces by executing a standalone executable file (e.g., an .exe file) or code (e.g., a JAVA applet) within a virtual machine. Clients 140 may execute applications 145 which perform merge operations of underlying data files stored in data store 110. Furthermore, clients 140 may execute the conflict resolution methods and processes described herein to resolve data conflicts between different versions of a data file stored in the data store 110. A user interface may be used to display underlying data records, and the like.

Figure 2A:
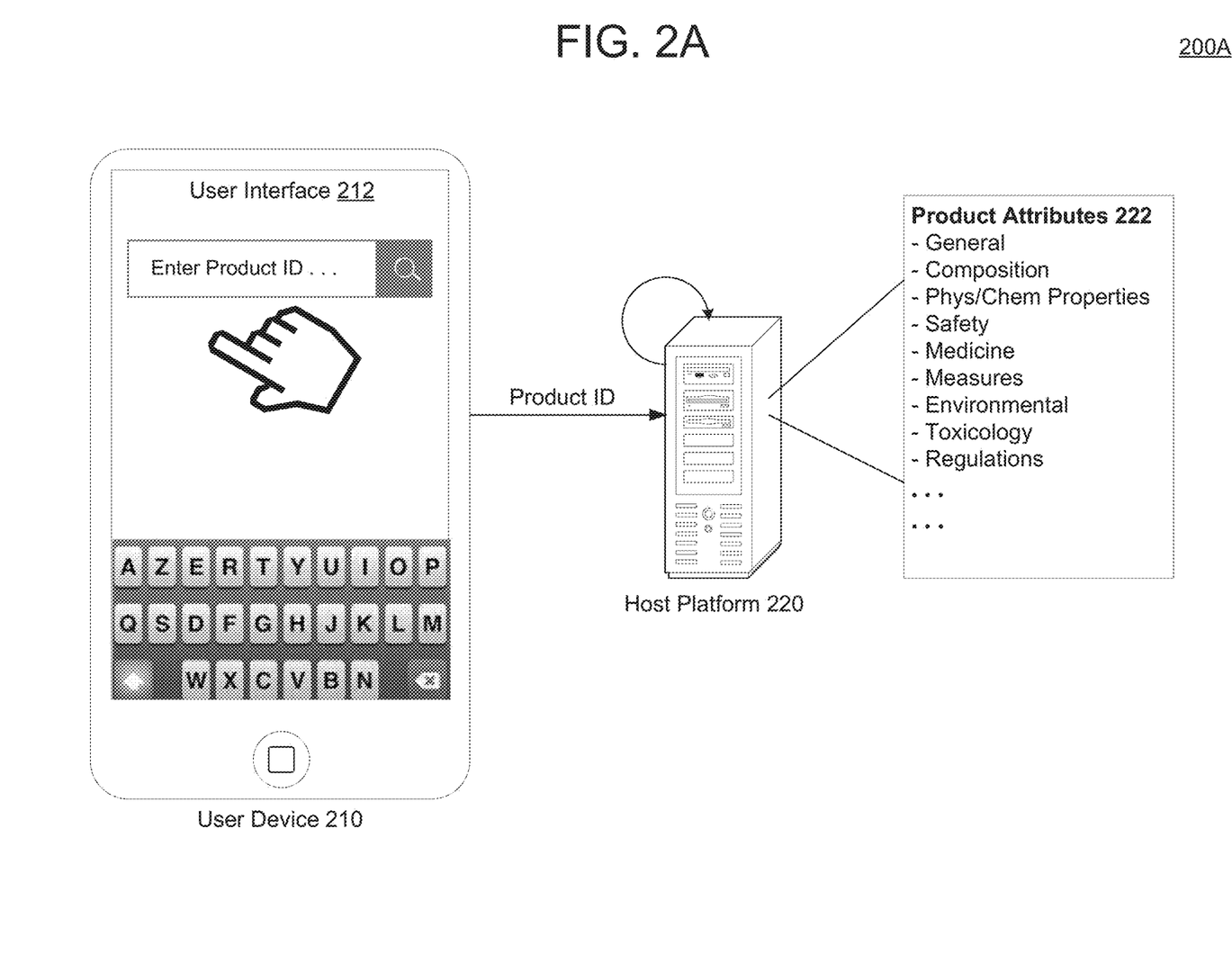
FIG. 2A is a diagram illustrating a user interface for inputting a product identifier in accordance with an example embodiment.

FIG. 2A illustrates of a process 200A of a user inputting a product identifier via a user interface in accordance with an example embodiment. Referring to the example of FIG. 2A, a user device 210 accesses a backend server (host platform 220) for performing a dangerous goods classification. Here, the user device 210 may connect to the host platform 220 via a network connection (e.g., Internet, private network, etc.) However, it should be appreciated that the embodiments are not limited thereto. As another example, the classification may be performed by the same device the receives the input. In this example, the user device 210 display a user interface 212 including a search field 214 that enables a user to input a product identifier such as a product name, a product ID, a serial number, or the like. In response, the product ID may be transmitted to the host platform 220 which retrieves attributes 222 of the product from a data store such as a database, a data file, an external system/resource, or the like.

In order to perform the dangerous goods classification task, each product can be characterized based on a plurality of well-defined product attributes 222 (also referred to herein as product properties). Examples of these product attributes 222 are shown below in the Appendix. The attributes 222 can be of physical or chemical nature (e.g., pH Value, molar mass, flash point, etc.). As another example, the attributes 222 can be of a regulatory matter (e.g., skin irritation, GHS classification, etc.). Each of the attributes 222 may be extracted from a stored location such as a database record and may be in a form that can be objectively measured or otherwise well-defined with respect to a regulation, e.g. predefined hazard statements. This leads to a system-agnostic product specification that is comprehensively defined and self-contained. In other words, all products can be searched based on the same product attributes allowing for different types of products to be classified using the same algorithm.

Figure 2B:
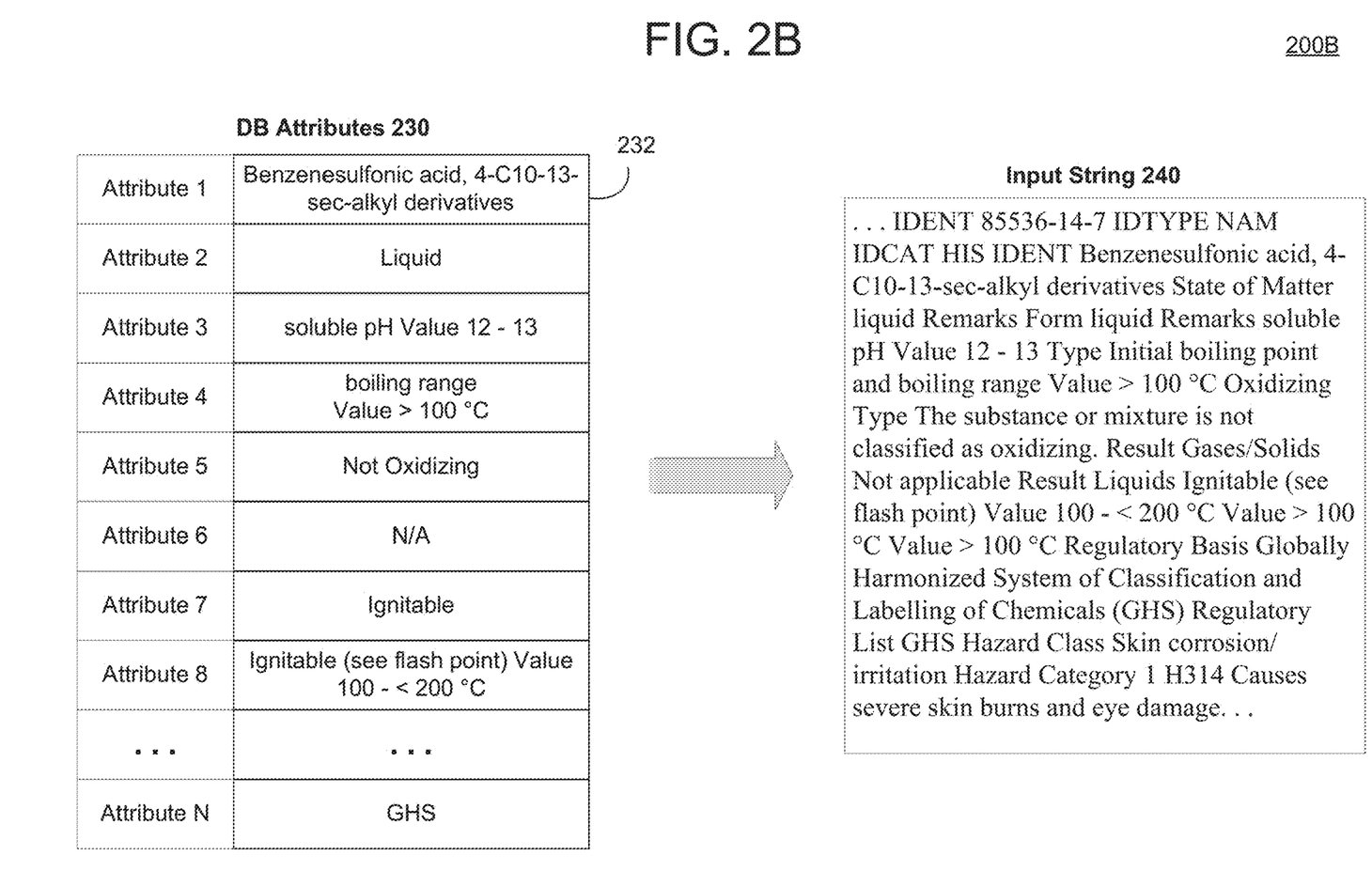
FIG. 2B is a diagram illustrating a process of product attributes being converted into an input string in accordance with an example embodiment.

FIG. 2B illustrates a process 200B of converting retrieved product attributes into an input string 240 in accordance with an example embodiment. Referring to the example of FIG. 2B, a plurality of attributes 230 are shown. These attributes 230 may be retrieved from a database in response to the item/product being identified as shown in the example of FIG. 2A. Each attribute 230 includes a respective value 232 which may include an alphanumeric value including text, words, characters, numbers, chemical formulas, descriptions, and the like, of a product property. In this example, N attributes 230 are shown and each has its own respective value 232, where N may be any number that is greater than zero. The product attributes 230 may be saved in a data store in advance and may include a list of properties (product properties in the appendix).

As shown in the example of FIG. 2B, the system may convert the different values 232 of the attributes 230 into a single input string 240. For example, the system may concatenate the retrieved values 232 into one long string that describes the entire database information of the product as a long sequence of textual information. The system may execute an algorithm that builds a feature string per product that is near English text and human-readable. The conversion from the tabular product definition into a string is a deterministic and rule-based process, which can be performed for any product. This feature string is the basis for subsequent training and inference of the classifier. The fact that the feature strings are legible is important to fulfill an important regulatory constraint: the intrinsic need to be able to explain the reasons for a DG classification to the authorities as is further shown in the example of FIG. 4. The resulting input string 240 includes a long concatenation of the attribute values (string) and is in a format that can be input into a machine learning algorithm such as a deep learning neural network which then predicts the dangerous goods classifications for all regulations at once.

Figure 3A:
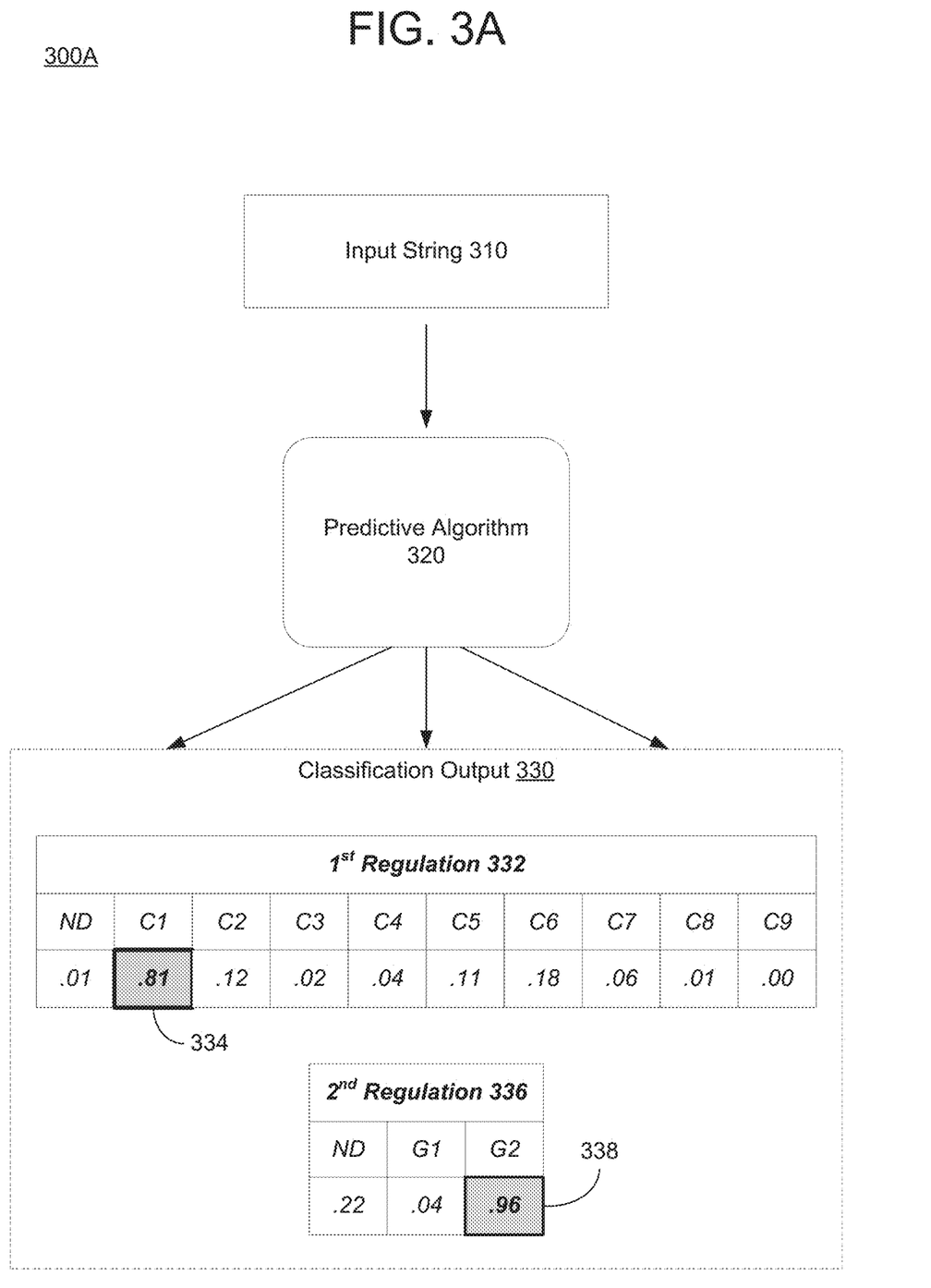
FIG. 3A is a diagram illustrating a process of predicting dangerous goods classifications for a product in accordance with an example embodiment.

FIG. 3A illustrates a process 300A of predicting dangerous goods classifications for a product in accordance with an example embodiment. Referring to FIG. 3A, the string input 310 that is generated by concatenating product attributes together into a readable format is input into a predictive algorithm 320. The predictive algorithm 320 may be a deep learning neural network that predicts dangerous goods specification for all regulations at once. It takes as input the string input 310, and performs a multi-label prediction (e.g., 9 class*7 regulations=63 labels, etc.) The predictive algorithm may identify patterns (sequences of small strings of text) within the input string 310 that impact a classification of the product into one of the classes of dangerous goods. The regulations each have their own dangerous goods classifications (such that they are similar but may include small differences, etc.) One non-limiting example is different flashpoints for flammable liquids, etc.

In this example, the predictive algorithm 320 solves a text-classification problem and generate a prediction for multiple labels/classes. In other words, the predictive algorithm 320 does not only predict one whether a product falls into one class of dangerous good, but can simultaneously predict whether the product fits into any of a plurality of classes for a plurality of different regulations. In the example of FIG. 3A, an output 330 is generated based on the results of the predictions by the predictive algorithm 320. Here, the output 330 includes a probability (e.g., a percentage) that a product fits into each of the classes of a plurality of regulations which include different classes of dangerous goods and one class for non-dangerous goods. In this example, the product is predicted to be included in a dangerous class 334 of a first regulation 332, and a dangerous class 338 of a second regulation 336. It should also be appreciated that more than two regulations may be predicated at the same time.

Although the output 330 in this example includes probabilities of whether the product fits into each of the classes, other examples include outputting Yes/No answers for each class, colored or visual identifiers of the classes of dangerous goods, descriptions of the classes of dangerous goods, and the like. In some embodiments, the output 330 may also include a description of various rules, regulations, etc., that are associated with such a classification of dangerous good to provide a viewer with additional information about the classification.

Figure 3B:
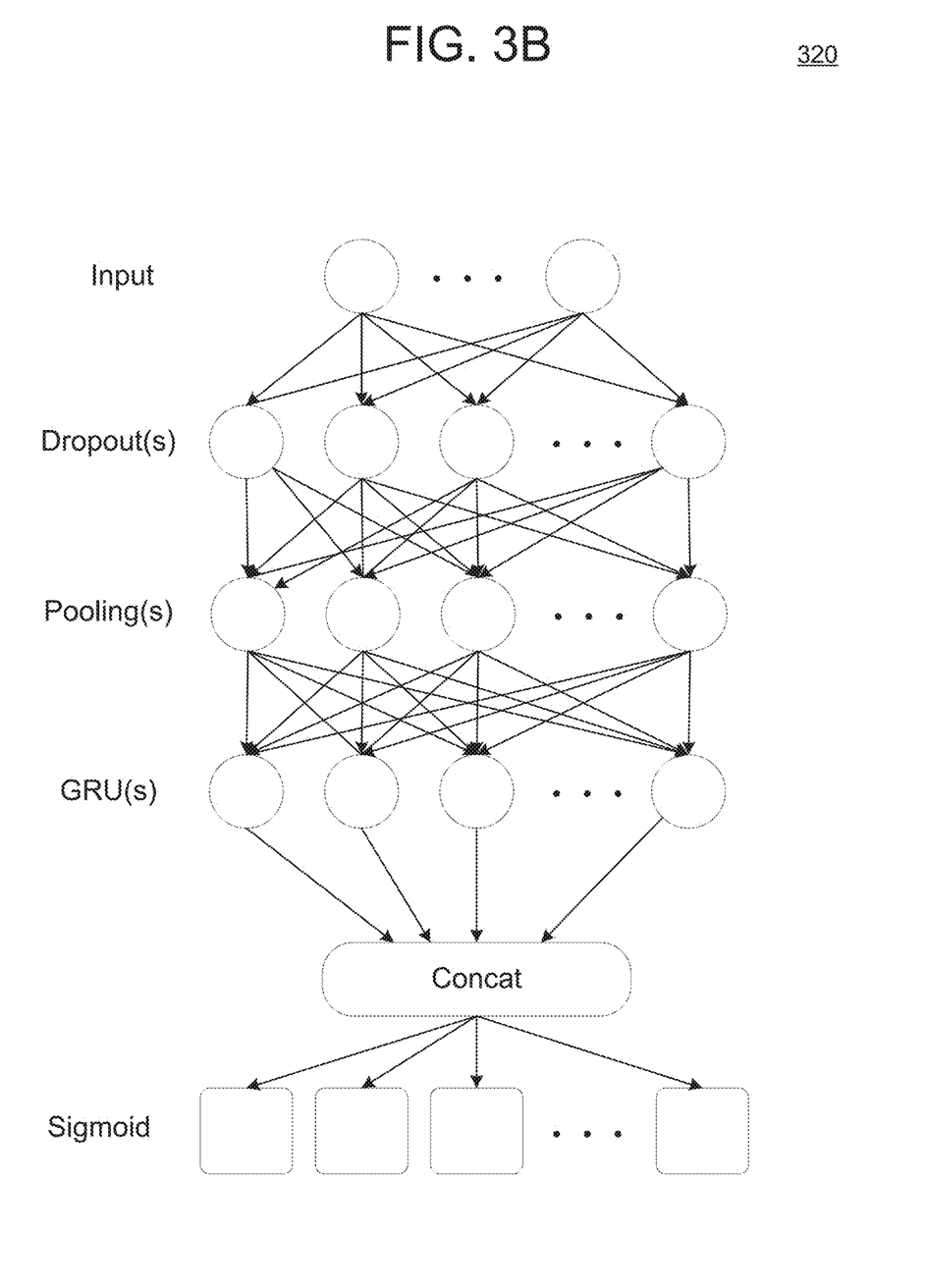
FIG. 3B is a diagram illustrating an example of an algorithm for performing the prediction in FIG. 3A, in accordance with an example embodiment.

FIG. 3B illustrates an example of the predictive algorithm 320 for performing the prediction in FIG. 3A, in accordance with an example embodiment. In the example of FIG. 3B, the predictive algorithm 320 is a deep learning neural network, however embodiments are not limited thereto. In the example of FIG. 3B, the deep learning neural network includes an input layer and an output layer as well as various additional hidden layers in between the input layer and the output layer such as one or more dropout layers, one or more pooling layers, one or more gated recurrent unit (GRU) layers, one or more concatenation layers, a predication layer (also referred to as a sigmoid layer), and the like.

The dangerous goods classification task needs to be performed independently for different regulations such as ADR or CFR—see appendix for details. This independent classification task may be performed simultaneously by one model predicting multiple dangerous goods classes for an input. Every regulation has a precise definition when a product must be handled as a dangerous good. Additionally, they define main risks for each product out of nine main risk classes (see appendix) and up to two subsidiary risks. As an estimation of the severity of the risks every dangerous good falls into one of three packing groups depending on the degree of danger they present to people and equipment. Although the regulations overlap most of the time, there are slight variation and different granularity of these definitions.

The predictive algorithm 320 can be used to solve this text classification problem as a multi-label problem where every risk (including subdivisions) per regulation is one label of the classifier, leading to a total number of dozens of labels for the training task (label encoding). The predictive algorithm 320 may be trained from historical text of already classified products thereby providing a corpus of learning for the predictive algorithm 320. The predictive algorithm may receive the input string 310 which includes the product attributes/chemical properties as one large chunk of text. Within the predictive algorithm 320 may include embedding techniques that convert the whole string information into a vectorized format. Then the predictive algorithm 320 may apply normal machine learning techniques to the text to identify patterns in the text that can be the basis of the classification of the product.

The attributes of the product include physical properties, chemical properties, etc. The algorithm may apply machine learning techniques such as dropout layer, convolution layer, etc. to identify important segments of text that effect classification (i.e., alphanumeric segments of text and numbers that impacts the labeling, etc.) The predictive algorithm 320 learns over a number of iterations and through error minimization and optimization it can determine which segment (s) of text is important to get the labels correct. One or more GRU layers may capture the text segments and a concatenation layer may combine the segments into a sequence which is passed to a prediction layer (sigmoid layer). We are making a prediction on whether the good belongs in each of the different classes. The different predictions for each of the classes of each of the regulations are generated using the Sigmoid function at the end. It will take as input all of the vectorized information and all the convolution information.

FIG. 4 illustrates a user interface 400 which provides a visual indicator 412 which can be used as proof of a reasoning for classifying the product into a dangerous goods class in accordance with an example embodiment. Often, there are legal consequences as a result of classification of an item as a dangerous good or non-dangerous good. The example embodiments provide a proof of why a decision was actually taken. The problem with deep learning neural networks is that they are traditionally a black box (hidden layers of computations). To address to, the system may include an algorithm which cuts an input string (also referred to as an output string 410 in this example). For example, the algorithm may divide the output string 410 in half (iteratively) creating two sub-strings. Then, the algorithm determines which sub-string has more impact on the classification of the product as a dangerous or non-dangerous good. The algorithm can continue to divide the impacting sub-string a number of times until it detects a sub-string that has the greatest effect on the final decision. Therefore the machine can highlight a portion of the string as a reason for deciding whether the product was dangerous, non-dangerous, etc.

Figure 5:
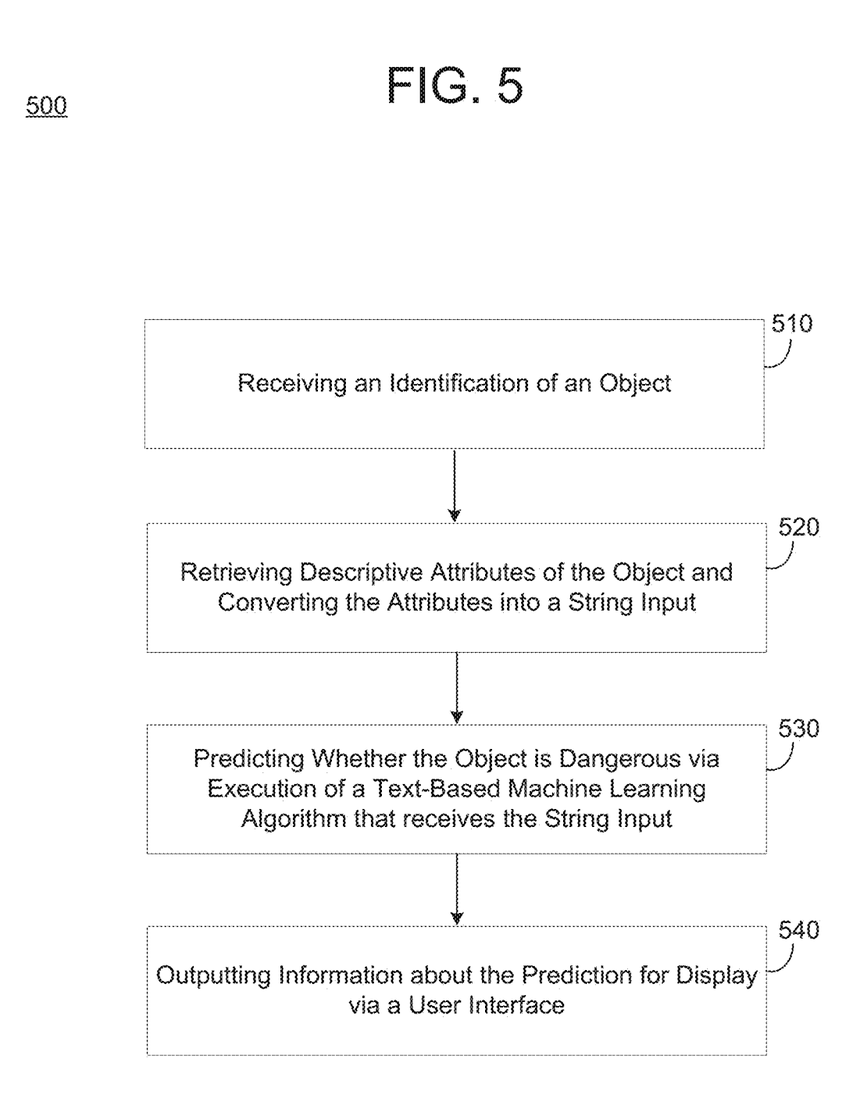
FIG. 5 is a diagram illustrating a method of predicting a dangerous goods classification in accordance with an example embodiment.

FIG. 5 illustrates a method 500 a method of predicting a dangerous goods classification in accordance with an example embodiment. For example, the method 500 may be performed by a database node, a cloud platform, a web server, an on-premises server, a computing system (user device), a combination of devices/nodes, or the like. Referring to FIG. 5, in 510, the method may include receiving an identification of an object. Here, the object may be a product, an item, a good, or the like. For example, the system may detect a product identifier (e.g., name, ID, serial number, description, data value, etc.) that is entered within a search bar or field of a user interface. As another example, the system may receive another type of communication such as a voice command, a hand gesture, or the like.

In 520, the method may include retrieving a plurality of descriptive attributes of the object from a data store and converting the plurality of descriptive attributes into an input string. For example, the descriptive attributes may include alphanumeric values/descriptions of properties and characteristics of the product such as its ingredient composition, chemical formulas, types of danger, warnings, and the like. The descriptive attributes may be stored in a database in advance of the identification being received. For example, the database may store product information for many new products based on data provided by a manufacture, etc., that desires to transport the products. In some embodiments, the converting may include concatenating the descriptive attributes into a single sequence of alphanumeric characters, and the predicting comprises inputting the single sequence into the text-based machine learning algorithm.

In 530, the method may include predicting whether the object is a dangerous object via execution of a text-based machine learning algorithm that receives the input string as an input. For example, the predicting may include classifying the object as being within one or more classes of dangerous goods, or classifying the object as non-dangerous. Different jurisdictions may adhere to different regulations. For example, the United States follows the regulations set forth in the CFR. Meanwhile, European transport follows different regulations such as the International Carriage of Dangerous Goods by Road (ADR). Each regulation may have multiple classifications of dangerous good. For example, the CFR identifies nine classes of dangerous goods and one class for non-dangerous. Meanwhile, the ADR also identifies nine classes of dangerous goods, but requirements to be considered within the different classes may vary from class to class with respect to the nine classes of the CFR.

In the example embodiments, the predictive algorithm can simultaneously predict or otherwise determine whether a good should be classified within any of a plurality of classes among any of a plurality of regulations. Therefore, rather than perform one classification at a time, the algorithm may perform dozens, or even hundreds of predictions at once. Furthermore, in 540 the method may include outputting information about the prediction of whether the object is dangerous for display via a user interface. For example, probabilities of whether a product falls within each of the respective classes of dangerous goods may be output. As another example, a Yes/No answer may be output for each class, or the like.

In some embodiments, the predicting may include simultaneously predicting whether the object is included within each of a plurality of different classes of dangerous objects via execution of the text-based machine learning algorithm. In some embodiments, the predicting may include simultaneously predicting whether the object is included within a plurality of different classes of dangerous objects for each of a plurality of different jurisdictions. In some embodiments, the outputting may include outputting a plurality of values corresponding to the plurality of different classes of dangerous objects, respectively, where each value indicates a probability that the object is included within a respective class of dangerous objects.

Although not illustrated in FIG. 5, in some embodiments, the method may further include identifying a sub-string within the input string that has a most impact on the prediction of whether the object is a dangerous object, and displaying the sub-string via the user interface. For example, the sub-string may include a chunk of text that impacts the reason for classifying the product as a particular class among the plurality of classes of dangerous goods or non-dangerous. In some embodiments, the sub-string may be identified by dividing the input string in half and determining which half has the most impact, and iteratively repeating the dividing and the determining a plurality of times to identify the sub-string. For example, the dividing and determining may be performed a predetermined number of times, until the sub-string is below a predetermined size, a random amount, and the like.

Figure 6:
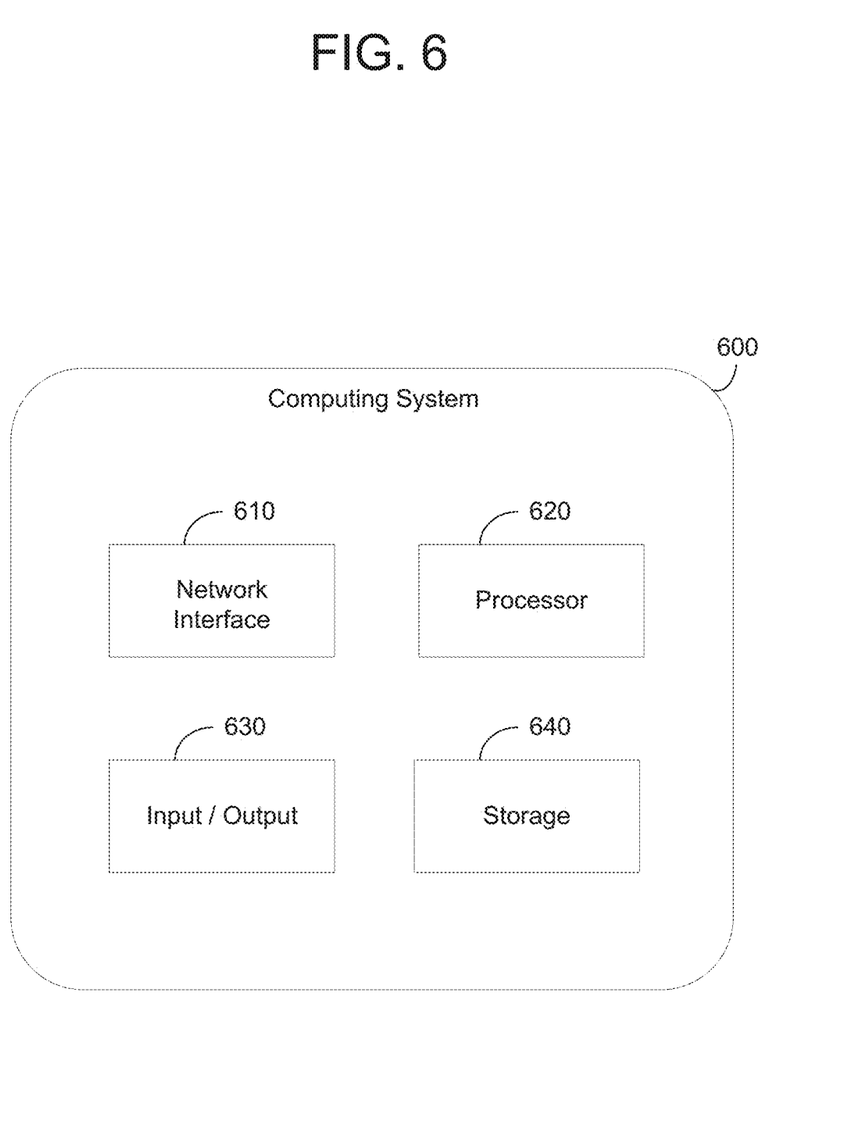
FIG. 6 is a diagram illustrating a computing system for use in the examples herein in accordance with an example embodiment.

FIG. 6 illustrates a computing system 600 that may be used in any of the methods and processes described herein, in accordance with an example embodiment. For example, the computing system 600 may be a database node, a server, a cloud platform, or the like. In some embodiments, the computing system 600 may be distributed across multiple computing devices such as multiple database nodes. Referring to FIG. 6, the computing system 600 includes a network interface 610, a processor 620, an input/output 630, and a storage device 640 such as an in-memory storage, and the like. Although not shown in FIG. 6, the computing system 600 may also include or be electronically connected to other components such as a display, an input unit(s), a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The input/output 630 may include an interface, a port, a cable, a bus, a board, a wire, and the like, for inputting and outputting data to and from the computing system 600. For example, data may be output to an embedded display of the computing system 600, an externally connected display, a display connected to the cloud, another device, and the like. The network interface 610, the input/output 630, the storage 640, or a combination thereof, may interact with applications executing on other devices.

The storage device 640 is not limited to a particular storage device and may include any known memory device such as RAM, ROM, hard disk, and the like, and may or may not be included within a database system, a cloud environment, a web server, or the like. The storage 640 may store software modules or other instructions which can be executed by the processor 620 to perform the method shown in FIG. 5. According to various embodiments, the storage 640 may include a data store having a plurality of tables, partitions and sub-partitions. The storage 640 may be used to store database records, items, entries, and the like. For example, the storage 640 may include products and properties of the products that are stored therein including descriptive attributes of the products such as chemical compositions, chemical properties, characteristics, and the like.

According to various embodiments, the processor 620 may receive an identification of an object from among the objects. For example, the object may be a tangible product or item that is sold as a good. The processor 620 may retrieve a plurality of descriptive attributes of the identified object from the storage and convert the plurality of descriptive attributes into an input string, and predict whether the object is a dangerous object via execution of a text-based machine learning algorithm that receives the input string as an input. Furthermore, the processor 620 may output information about the prediction of whether the object is dangerous for display via a user interface. Here, the user interface may be displayed on a screen that is embedded within or externally connected to the computing system 600. As another example, the user interface may be displayed on another device or system that is connected to the computing system 600 via a cable, a network connection, or the like.

To generate the input string, the processor 620 may retrieve descriptive attributes (e.g., textual and/or alphanumeric strings or segments of data), and concatenate the descriptive attributes into a single sequence of alphanumeric characters. In other words, the processor 620 may retrieve dozens of descriptive attributes of a product and create one long string value by concatenating the words, text, numbers, etc., into a single sequence of characters. The processor 620 may input the single sequence into the text-based machine learning algorithm. As an example, the text-based machine learning algorithm may be a deep learning neural network that is trained on historical text of dangerous good classifications. The algorithm may identify patterns (short segments of text) within the input string that impact whether the product will be classified into one or more of the classes of dangerous goods (or non-dangerous).

The processor 620 may execute the machine learning algorithm which causes the processor 620 to simultaneously predict whether the object is included within each of a plurality of different classes of dangerous objects via execution of the text-based machine learning algorithm. In some embodiments, the processor 620 may simultaneously predict whether the object is included within a plurality of different classes of dangerous objects for each of a plurality of different jurisdictions. The predictions may be output to a screen of a user device and can be used to classify a product as dangerous or not, and also identify any regulations that are associated with the dangerous good. The prediction may be used to support a subject matter expert when making a decision on whether a product is a dangerous good thereby improving the accuracy of the expert and reducing the time consumed.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

Listed below in the Appendix are various examples of regulations, classes of dangerous goods, and product properties which are used to predict whether a product is a dangerous good are listed below.

APPENDIX

Regulations
    European Agreement concerning the International Carriage of Dangerous Goods by Road (ADR),
    US Code of Federal Regulations (CFR),
    International Air Transport Association Cargo (IATA C),
    International Air Transport Association Passenger (IATA P),
    International Maritime Dangerous Goods Code (IMDG),
    Transportation of Dangerous Goods (TDG),
    UN Model Regulations
Danger Classes
    Class 1: Explosives
    Class 2: Gases
    Class 3: Flammable liquids
    Class 4: Flammable solids; substances liable to spontaneous combustion; substances which, on contact with water, emit flammable gases
    Class 5: Oxidizing substances and organic peroxides
    Class 6: Toxic and infectious substances
    Class 7: Radioactive material
    Class 8: Corrosive substances
    Class 9: Miscellaneous dangerous substances and articles.
Packing Groups
    Packing group I: Substances presenting high danger Packing group II: Substances presenting medium danger
Packing group III: Substances presenting low danger.
Product Properties
  Type of Substance
  Use of Substance/Preparation
  Specific Use(s) of Products
  Standard Composition
  Chemical Characterization
  Legal Composition
  State of Matter
  Flow Time
  Vapor Pressure
  Form
  Solubility in Water
  pH
  Phase Transition Liquid/Gas
  Partition Coefficient n-Octanol/Water
  Viscosity, Dynamic
  Viscosity, Kinematic
  Corrosion of Metals
  Molar Mass
  Particle size
  Burning Rate
  Self Ignition
  Formation of Flammable Gases
  Oxidizing
  Flammability
  Flash Point
  Solvent Separation Test
  Upper Explosion/Flammability Limit
  Lower Explosion/Flammability Limit
  Peroxides
  Radioactivity
  Reactions with Water/Air
  Thermal Decomposition
  SADT
  Heat of Combustion
  SAPT
  Biodegradation
  Bioaccumulation
  Acute and Prolonged Toxicity to Fish
  Acute Toxicity to Aquatic Invertebrates
  Toxicity to Aquatic Plants
  Chronic Toxicity to Fish
  Chronic Toxicity to Aquatic Invertebrates
  Assessment Ecotoxicity
  Acute Oral Toxicity
  Acute Inhalation Toxicity
  Acute Dermal Toxicity
  Skin Irritation
  Eye Irritation
  Transport Temperature
  Further Information for Transport (SDS)
  Dangerous Goods Classification
  Dangerous Goods Regulations
  Agreement of authorities
  Hazard Notes
  Control Temperature
  Additional Data for Transport
  Hazard inducer
  Output of Dangerous Goods Information
  Dangerous Goods User-Defined Texts
  Reportable Quantities (US)
  Poisonous by Inhalation (US)
  Spill Reporting (US)
  M Factor
  Specific Concentration Limits (GHS)
  GHS Classification (General)
  Other Regulatory Codes

What is claimed is:

1. A computing system comprising:
  a storage configured to store descriptive attributes of objects; and
  a processor configured to
    receive an identification of an object from among the objects,
    retrieve a plurality of descriptive attributes of the identified object from the storage and convert the plurality of descriptive attributes into an input string, and
    predict whether the object is a dangerous object via execution of a neural network which receives the input string as an input and outputs a multi-label prediction, wherein the multi-label prediction comprises a plurality of labels identifying whether the object is classified within a plurality of different classes of dangerous objects, respectively, and
    display information about the prediction of whether the object is dangerous via a user interface based on the plurality of labels included in the multi-label prediction output by the neural network.

2. The computing system of claim 1, wherein the plurality of descriptive attributes comprise a plurality of chemical properties of the object.

3. The computing system of claim 1, wherein the processor is configured to concatenate the descriptive attributes into a single sequence of alphanumeric characters, and input the single sequence into the neural network.

4. The computing system of claim 1, wherein the processor is configured to simultaneously predict whether the object is included within each of the plurality of different classes of dangerous objects via execution of the neural network.

5. The computing system of claim 4, wherein the processor is configured to simultaneously predict whether the object is included within the plurality of different classes of dangerous objects for each of a plurality of different jurisdictions.

6. The computing system of claim 4, wherein the neural network is configured to output a plurality of numerical values corresponding to the plurality of different classes of dangerous objects, respectively, where each value indicates a probability that the object is included within a respective class of dangerous objects.

7. The computing system of claim 1, wherein the processor is further configured to identify a sub-string within the input string that has a greatest impact on the prediction of whether the object is a dangerous object based on one or more layers within the neural network, display the input string via a user interface, and visually distinguish the identified sub-string from other sub-strings within the input string via the user interface.

8. The computing system of claim 1, wherein the processor is configured to divide the input string in half and determine which half has the most impact, and
  the processor is further configured to iteratively repeat the dividing and the determining a plurality of times to identify the sub-string.

9. A method comprising:
  receiving an identification of an object;
  retrieving a plurality of descriptive attributes of the object from a data store and converting the plurality of descriptive attributes into an input string;

predicting whether the object is a dangerous object via execution of a neural network that receives the input string as an input and outputs a multi-label prediction, wherein the multi-label prediction comprises a plurality of labels identifying whether the object is classified within a plurality of different classes of dangerous objects, respectively; and displaying information about the prediction of whether the object is dangerous via a user interface based on the plurality of labels included in the multi-label prediction output by the neural network.

10. The method of claim 9, wherein the plurality of descriptive attributes comprise a plurality of chemical properties of the object.

11. The method of claim 9, wherein the converting comprises concatenating the descriptive attributes into a single sequence of alphanumeric characters, and the predicting comprises inputting the single sequence into the neural network.

12. The method of claim 9, wherein the predicting comprises simultaneously predicting whether the object is included within each of the plurality of different classes of dangerous objects via execution of the neural network.

13. The method of claim 12, wherein the predicting comprises simultaneously predicting whether the object is included within the plurality of different classes of dangerous objects for each of a plurality of different jurisdictions.

14. The method of claim 12, wherein the outputting comprises outputting, via the neural network, a plurality of numerical values corresponding to the plurality of different classes of dangerous objects, respectively, where each value indicates a probability that the object is included within a respective class of dangerous objects.

15. The method of claim 9, further comprising identifying a sub-string within the input string that has a greatest impact on the prediction of whether the object is a dangerous object based on one or more layers within the neural network, display the input string via a user interface, displaying the input string via a user interface, and visually distinguishing the identified sub-string from other sub-strings within the input string via the user interface.

16. The method of claim 9, wherein the identifying comprises dividing the input string in half and determining which half has the most impact, and iteratively repeating the dividing and the determining a plurality of times to identify the sub-string.

17. A non-transitory computer-readable medium comprising instructions which when executed by a processor cause a computer to perform a method comprising:

receiving an identification of an object;

retrieving a plurality of descriptive attributes of the object from a data store and converting the plurality of descriptive attributes into an input string;

predicting whether the object is a dangerous object via execution of a neural network that receives the input string as an input and outputs a multi-label prediction, wherein the multi-label prediction comprises a plurality of labels identifying whether the object is classified within a plurality of different classes of dangerous objects, respectively; and displaying information about the prediction of whether the object is dangerous for display via a user interface based on the plurality of labels included in the multi-label prediction output by the neural network.

18. The non-transitory computer-readable medium of claim 17, wherein the plurality of descriptive attributes comprise a plurality of chemical properties of the object.

19. The non-transitory computer-readable medium of claim 17, wherein the converting comprises concatenating the descriptive attributes into a single sequence of alphanumeric characters, and the predicting comprises inputting the single sequence into the neural network.

20. The non-transitory computer-readable medium of claim 17, wherein the predicting comprises simultaneously predicting whether the object is included within each of the plurality of different classes of dangerous objects via execution of the neural network.

* * * * *